United States Patent
Aoki (10) Patent No.: US 10,913,313 B2
(45) Date of Patent: Feb. 9, 2021

(54) PNEUMATIC TIRE

(71) Applicant: BRIDGESTONE CORPORATION, Tokyo (JP)

(72) Inventor: Naotoshi Aoki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 505 days.

(21) Appl. No.: 15/327,261

(22) PCT Filed: Jul. 28, 2015

(86) PCT No.: PCT/JP2015/003778
§ 371 (c)(1),
(2) Date: Jan. 18, 2017

(87) PCT Pub. No.: WO2016/017149
PCT Pub. Date: Feb. 4, 2016

(65) Prior Publication Data
US 2017/0157985 A1    Jun. 8, 2017

(30) Foreign Application Priority Data
Jul. 28, 2014   (JP) ................. 2014-153167

(51) Int. Cl.
*B60C 3/06*    (2006.01)
*B60C 13/00*   (2006.01)
(Continued)

(52) U.S. Cl.
CPC ............ *B60C 9/30* (2013.01); *B60C 3/06* (2013.01); *B60C 11/0304* (2013.01);
(Continued)

(58) Field of Classification Search
CPC .......... B60C 3/06; B60C 13/00; B60C 15/06; B60C 15/0628; B60C 2015/0667
See application file for complete search history.

(56) References Cited

U.S. PATENT DOCUMENTS

| 6,607,018 B1* | 8/2003 | Fukunaga ........... B60C 11/0304 |
| | | 152/209.8 |
| 2008/0115868 A1 | 5/2008 | Eicher et al. |
| 2013/0112325 A1 | 5/2013 | Mukai |

FOREIGN PATENT DOCUMENTS

| CN | 102348563 A | 2/2012 |
| CN | 103085606 A | 5/2013 |

(Continued)

OTHER PUBLICATIONS

Machine translation of WO 2006/128550, 2006.*

(Continued)

*Primary Examiner* — Justin R Fischer
(74) *Attorney, Agent, or Firm* — Oliff PLC (57) ABSTRACT

A pneumatic tire in which a side reinforcement layer formed of a treated member is arranged, the treated member formed by coating with rubber organic fiber cords extending parallelly to ply cords of a carcass ply of the carcass main body, only on a sidewall portion of a half portion on one tire widthwise side; a tire radial inner end of the side reinforcement layer is located on a side inner in the tire radial direction than a tire radial outermost position of a rim flange, and a tire radial outer end of the side reinforcement layer overlaps the belt by 5 mm or more in a tire widthwise direction; and the tread portion has one or more circumferential main grooves, and a contact width of a tire widthwise outermost land portion is larger than a contact width of a tire widthwise outermost land portion.

13 Claims, 3 Drawing Sheets

(51) Int. Cl.
- B60C 15/06 (2006.01)
- B60C 9/30 (2006.01)
- B60C 11/13 (2006.01)
- B60C 11/03 (2006.01)
- B60C 15/02 (2006.01)
- B60C 15/04 (2006.01)
- B60C 19/00 (2006.01)
- B29D 30/32 (2006.01)
- B29D 30/38 (2006.01)
- B29D 30/48 (2006.01)
- B29D 30/72 (2006.01)

(52) U.S. Cl.
CPC .............. *B60C 11/13* (2013.01); *B60C 13/00* (2013.01); *B60C 15/02* (2013.01); *B60C 15/04* (2013.01); *B60C 15/06* (2013.01); *B60C 15/0603* (2013.01); *B60C 19/001* (2013.01); B29D 30/32 (2013.01); B29D 30/38 (2013.01); B29D 30/48 (2013.01); B29D 30/72 (2013.01); B29D 2030/722 (2013.01); B60C 2015/0696 (2013.01)

(56) References Cited

FOREIGN PATENT DOCUMENTS

| | | |
|---|---|---|
| DE | 3720788 A1 | 1/1988 |
| GB | 1115834 A | 5/1968 |
| GB | 1140473 A | 1/1969 |
| JP | S59-40903 A | 3/1984 |
| JP | S61-253205 A | 11/1986 |
| JP | H06-143945 A | 5/1994 |
| JP | H06-199113 A | 7/1994 |
| JP | 2001-030712 A | 2/2001 |
| JP | 2003-231405 A | 8/2003 |
| JP | 2006-218889 A | 8/2006 |
| JP | 2008-006870 A | 1/2008 |
| JP | 2008-155866 A | 7/2008 |
| JP | 2008-279877 A | 11/2008 |
| JP | 2008-542129 A | 11/2008 |
| JP | 2009-214769 A | 9/2009 |
| JP | 2010-012881 A | 1/2010 |
| JP | 2010-202122 A | 9/2010 |
| JP | 2010-247698 A | 11/2010 |
| JP | 2013-014227 A | 1/2013 |
| JP | 2013-100020 A | 5/2013 |
| JP | 2013-169884 A | 9/2013 |
| WO | WO 2006/128550 | * 12/2006 |

OTHER PUBLICATIONS

Jul. 20, 2017 Extended Search Report issued in European Patent Application No. 15827636.0.

Oct. 27, 2015 International Search Report issued in International Patent Application No. PCT/JP2015/003778.

* cited by examiner

PNEUMATIC TIRE

TECHNICAL FIELD

This disclosure relates to a pneumatic tire.

BACKGROUND

Regarding pneumatic tires (hereinafter referred to as merely "tires"), especially in the case used on roads which are not sufficiently maintained, the resistance to external damage is an important performance. Recently, the vehicle penetration rate in developing countries, in which there are vast areas with insufficiently maintained roads, and thus requirement to resistance to external damage is increased.

Such external damage is inclusive of so-called "pinch cut", which refers to cuts of the carcass plies occasionally generated due to the reason that when driving over road segment differences such as curbstones, potholes (small holes generated due to sinkage of a part of a road surface paved with asphalt, etc.) and the like, the tire side portion is raised up and sandwiched between the road protrusion and the rim flange.

Proposed as a method for ensuring the resistance to pinch cut (pinch cut resistance) is to use carcass plies with an overlapped two-layer structure, and, for example, as described in PTL1, to use a single carcass ply with an envelope structure (a structure such that end portions of the carcass plies extend to the carcass crown portion and the belt layer, and is sandwiched therebetween).

CITATION LIST

Patent Literature

PTL1: JP2001-30712A

SUMMARY

Technical Problem

Recently, in order to maintain the other performances of the tire, and simultaneously save energy in consideration of the earth environment, reduction in tire weight is required in order to reduce the rolling resistance of the tire. In the case where the number of carcass plies of the side portion is increased according to PTL1, although the resistance to pinch cut is improved, there is a problem of increase in the tire weight. Therefore, a method for ensuring the resistance to pinch cut without increasing the number of carcass plies, is desired.

In view of the aforementioned problem, this disclosure is to provide a pneumatic tire which achieves both weight reduction and durability, and simultaneously enables optimization of conicity.

Solution to Problem

The subject of this disclosure is as follows.

The pneumatic tire of this disclosure includes: a carcass formed of at least one carcass ply, the carcass ply formed of a carcass main body and a carcass folded-up portion, the carcass main body extending toroidally from a tread portion through a pair of sidewall portions to a pair of bead portions, and fixed to bead cores embedded in the bead portions, the carcass folded-up portion extending from the carcass main body and formed by folding up a circumference of the bead cores from a tire widthwise inner side to a tire widthwise outer side; a belt formed of one or more belt layers arranged on a tire radial outer side of a crown portion of the carcass; and bead fillers provided on a tire radial outer side of the bead cores, in which: the bead fillers are provided such that at least a part thereof is sandwiched between the carcass main body and the carcass folded-up portion; a side reinforcement layer is arranged inside the carcass main body, the side reinforcement layer formed of a treated member, the treated member formed by coating with rubber organic fiber cords extending parallelly to ply cords of the carcass ply of the carcass main body, only on a sidewall portion of a half portion on one tire widthwise side partitioned by a tire equatorial plain; at an unloaded condition, when the pneumatic tire is mounted to an applicable rim and is applied with a prescribed internal pressure, a tire radial inner end of the side reinforcement layer is located on a side inner in the tire radial direction than a tire radial outermost position of a rim flange, and a tire radial outer end of the side reinforcement layer overlaps the belt by 5 mm or more in a tire widthwise direction; and the tread portion has one or more circumferential main grooves extending in a tire circumferential direction, and at an unloaded condition, when the pneumatic tire is mounted to an applicable rim and is applied with a prescribed internal pressure, a contact width of a tire widthwise outermost land portion partitioned by the one or more circumferential main grooves and a tread edge on one tire widthwise side is larger than a contact width of a tire widthwise outermost land portion partitioned by the one or more circumferential main grooves and a tread edge on the other tire widthwise side.

Here, the "applicable rim" is a valid industrial standard for the region in which the tire is produced or used, and refers to a standard rim of an applicable size according to the "JATMA Year Book" in Japan, the "ETRTO STANDARD MANUAL" in Europe, or the "TRA YEAR BOOK" in the United States of America (the "Measuring Rim" in the STANDARDS MANUAL of ETRTO, and the "Design Rim" in the "YEAR BOOK" of TRA).

Moreover, the "prescribed internal pressure" refers to an internal pressure corresponding to a tire maximum load carrying capacity (maximum air pressure) of a standard of in the aforementioned tire of an applicable size.

The side reinforcement layer "extending parallelly to the carcass ply" refers to that the dimensional difference at any point in the tire width direction between the carcass ply and the side reinforcement portion at any point of the side reinforcement portion is 50% or less.

The "contact width" refers to a maximum width in the tire width direction of the contact surface in contact with a flat plate when the tire surface is in contact with the flat plate at a condition when the pneumatic tire is mounted to an applicable rim, applied with a prescribed internal pressure, and applied with a maximum load.

The "tread edge" refers to a tire widthwise outermost contact position in the aforementioned contact surface of the tread portion.

The "maximum load" refers to a maximum load (maximum load capability) of a single wheel with an applicable size as described in the aforementioned standards.

"Overlaps the belt by 5 mm or more in a tire widthwise direction" refers to overlapping by 5 mm or more in the tire width direction a maximum width belt layer with a maximum tire widthwise width among one or more belt layers forming the belt.

"Extending in a tire circumferential direction" refers to extending toward the tire circumferential direction, and is inclusive of the case extending continuously in a zigzag shape toward the tire circumferential direction, and the case extending continuously in a bended shape toward the tire circumferential direction.

The "thickness of the side rubber" mentioned below refers to a length of a perpendicular line falling upon the aforementioned organic fiber cord from the sidewall portion surface of the tire maximum width portion as for the aforementioned half portion on one side, and refers to a length of a perpendicular line falling upon a ply cord of the aforementioned carcass ply as for the aforementioned half portion on the other side, at an unloaded condition, when the pneumatic tire is mounted to an applicable rim and is applied with a prescribed internal pressure.

The "belt end" mentioned below refers to a side on a tire widthwise outer end of the belt layer.

Advantageous Effect

According to this disclosure, it is possible to provide a pneumatic tire which achieves both weight reduction and durability, and simultaneously enables optimization of conicity.

DETAILED DESCRIPTION

As the results of extensive study, we found that the deformation volume of the wheel when the tire is applied with a load of the inner side when mounted to a vehicle is larger than the outer side when mounted to a vehicle, and thus the inner side when mounted to a vehicle has a better resistance to pinch cut. Based on the aforementioned discovery, we considered that it is possible to obtain the same resistance to pinch cut when using two carcass plies on the outer side when mounted to a vehicle by using one carcass ply on the inner side when mounted to a vehicle.

Based on such discovery, we further studied an asymmetric structure in which a reinforcement layer is arranged only on the outer side when mounted to a vehicle. As a result, it was discovered that when using an asymmetric structure in which a reinforcement layer formed of a treated member, of which the organic fiber cords are coated with rubber, is arranged in a predetermined region, although it is possible to maintain the pinch cut resistance while reduce the weight, since the tire uses an asymmetric structure, the conicity of the tire is varied. As the results of further extensive study, we found that the variation of conicity due to use of the asymmetric structure in the tire can be counterbalanced with the conicity generated by setting the contact width of the shoulder land portion on the outer side when mounted to a vehicle larger than the contact width of the shoulder land portion on the inner side when mounted to a vehicle. This disclosure is made based on the discovery as described above.

Hereinafter, an embodiment of this disclosure will be described with reference to the drawings.

Figure 1:
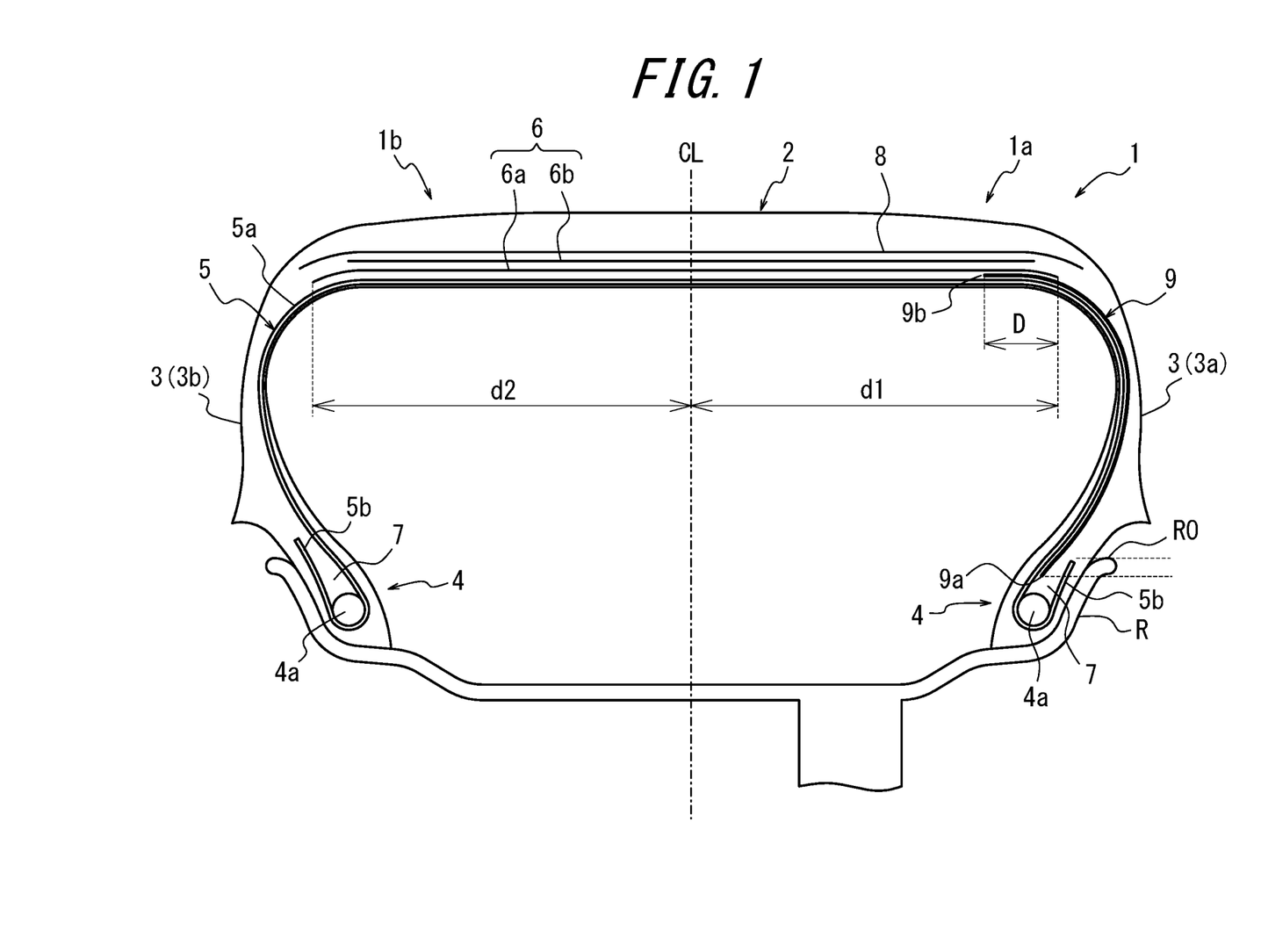
FIG. 1 illustrates a schematic cross-sectional view in the tire width direction of the pneumatic tire according to an embodiment of this disclosure.

FIG. 1 illustrates a schematic cross-sectional view in the tire width direction of the pneumatic tire (hereinafter referred to as merely "the tire") according to an embodiment of this disclosure. In FIG. 1, each member is illustrated schematically for ease of understanding. Therefore, there is the probability that the members as illustrated in FIG. 1 have shape or size different from actual members. Moreover, in FIG. 1, the tire widthwise cross section of the tire at a standard condition, when the tire is mounted to an applicable rim, applied with a prescribed internal pressure and set to an unloaded condition, is illustrated.

As illustrated in FIG. 1, the tire (pneumatic tire) 1 of the present embodiment is formed of a tread portion 2 and a pair of sidewall portions 3, and includes a pair of bead portions 4, a carcass 5, a belt 6 and bead fillers 7.

The carcass 5 is formed of at least one carcass ply formed of a carcass main body 5a and a carcass folded-up portion 5b. The carcass main body 5a of the carcass 5 extends toroidally from the tread portion 2 through the pair of sidewall portions 3 to the pair of bead portions 4, and is fixed to bead cores 4a embedded in the bead portions 4. The carcass folded-up portion 5b extends from the carcass main body 5a and folds up the circumference of the bead cores 4a from the tire widthwise inner side to the outer side. The material of the cords of the carcass ply of the carcass 5 is not specifically limited, and can be, e.g., steel cord, etc. In FIG. 1, the carcass 5 is formed of one carcass ply, while the carcass 5 can be as well formed of two or more carcass plies.

The belt 6 of the tire 1 according to the present embodiment as illustrated in FIG. 1 is formed of a belt layer 6a arranged on the tire radial outer side of the crown portion of the carcass 5, and a belt layer 6b having a tire widthwise width smaller than the belt layer 6a. The two belt layers 6a, 6b are inclined belt layers of which the belt cords extend in a manner inclined with respect to the tire circumferential direction and cross each other within the layers. The material of the belt cord is not specifically limited, and can be, e.g., steel cord. The belt layer 6a arranged on the tire radial inner side has a tire widthwise width larger than the tire widthwise width of the belt layer 6b arranged on the tire radial outer side direction. In this disclosure, the belt structure is not limited to the aforementioned example, and the number of belt layers, the widths of each belt layer, the material of the belt cords, etc. can be appropriately varied The bead fillers 7 are provided on the tire radial outer sides of the bead cores 4a in a manner such that a part of the tire radial inner side is sandwiched by the main body 5a and the turn-up portion 5b of the carcass 5.

As illustrated in FIG. 1, the tire 1 of the present embodiment includes a belt reinforcement layer 8 on the tire radial outer side of the belt 6. The present embodiment has one belt reinforcement layer 8, which has a size capable of covering the belt layers 6a and 6b of the belt 6 in the whole tire width direction. The belt reinforcement layer 8 can use cords formed of, e.g., organic fibers, which is not specifically limited, and can be cords formed of organic fibers such as aramid and the like, or hybrid cords of aramid and nylon, etc. The present embodiment has one belt reinforcement layer 8, but can have two or more as well. Moreover, the tire 1 of this disclosure can include no belt reinforcement layers 8.

The belt layer 6a of the present embodiment is arranged in a manner such that regarding the tire widthwise distance from an end of the belt layer 6a to the tire equatorial plain CL, as compared to the distance d1 of the half portion 1a on one side in the tire width direction partitioned by the tire equatorial plain CL of the tire 1, the distance d2 of the half portion 1b of the other in the tire width direction partitioned by the tire equatorial plain CL of the tire 1 is larger.

In the present embodiment, among the pair of sidewall portions 3, a side reinforcement layer 9 is provided only on a sidewall portion 3a of the half portion 1a on the one side in the tire width direction partitioned by the tire equatorial plain CL of the tire 1. Namely, the side reinforcement layer 9 is not disposed on a sidewall portion 3b of the half portion 1b on the other side in the tire width direction partitioned by the tire equatorial plain CL of the tire 1. The side reinforcement layer 9 is formed of a treated member of which the organic fiber cords are coated with rubber, and is arranged within the sidewall portion 3a on one side (in the present embodiment, the tire widthwise outer side of the main body 5a of the carcass 5 within the sidewall portion 3a) in a manner such that the extension direction of the organic fiber cords is parallel to the extension direction of the ply cords of the carcass ply of the carcass main body 5a of the carcass 5 (i.e., substantively the same direction as the ply cords).

As illustrated in FIG. 1, the side reinforcement layer 9 of the present embodiment is disposed in a manner such that at an unloaded condition (standard condition), when the pneumatic tire 1 is mounted to an applicable rim and is applied with a prescribed internal pressure, a tire radial inner end portion 9a of the side reinforcement layer 9 is located on a side inner in the tire radial than the tire radial outermost position RO of a flange of a rim R. Moreover, at the standard condition, the side reinforcement layer 9 of the present embodiment has a tire widthwise overlapping width D of 5 mm or more of a tire radial outer end portion inclusive of a tire radial outer end 9b of the side reinforcement layer 9 and a maximum width belt layer (in the present embodiment, the belt layer 6a) having a maximum tire widthwise width among the belt layer forming the belt 6.

Figure 2:
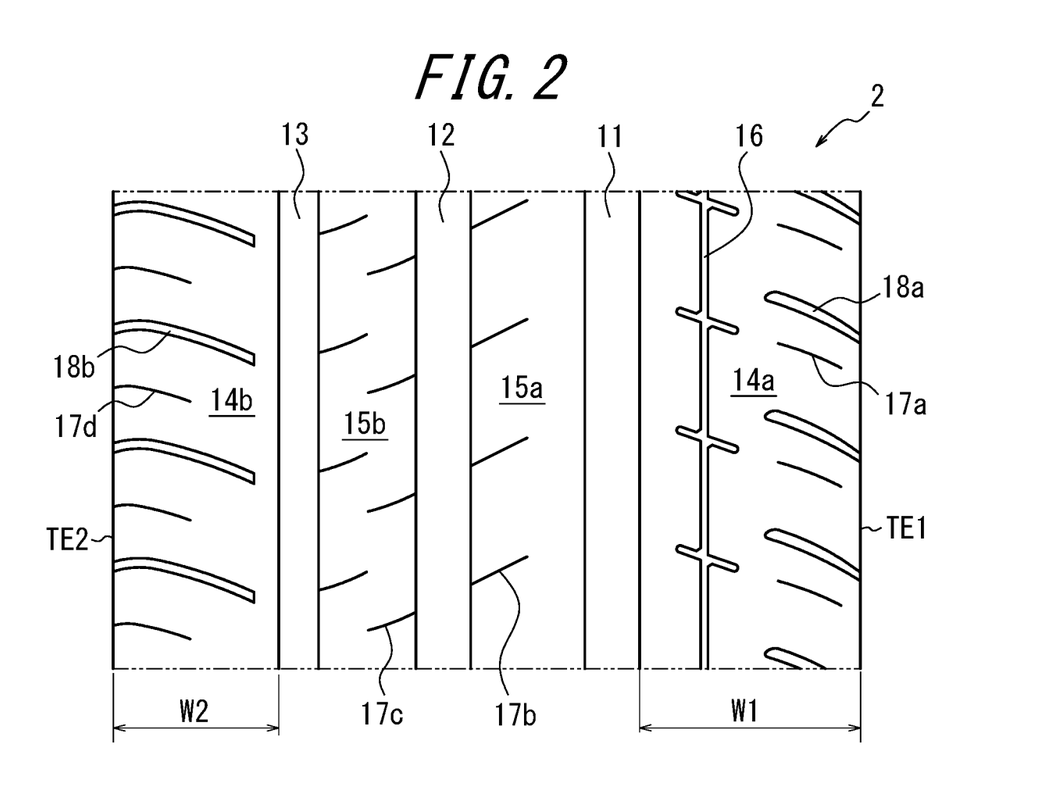
FIG. 2 illustrates a developed view of the tread surface of the tire of FIG. 1 at an unloaded condition, when the tire is mounted to an applicable rim and is applied with a prescribed internal pressure.

FIG. 2 illustrates a developed view of the tread surface at an unloaded condition, when the tire of FIG. 1 is mounted to an applicable rim and is applied with a prescribed internal pressure. The tread portion 2 has circumferential main grooves 11, 12, 13 extending in the tire circumferential direction, and land portions are partitioned by these circumferential main grooves and tread edges TE1 and TE2. In the present embodiment, the three circumferential main grooves 11, 12 and 13 are formed in order from the sidewall portion 3a side on which the side reinforcement layer 9 is disposed. In the present embodiment, the circumferential main grooves 11 and 13 are formed in a manner such that a contact width W1 of a land portion 14a on a tire widthwise outermost side of the half portion 1a on one side of the tire 1, which is partitioned by the circumferential main groove 11 and the tread edge TE1, is larger than a contact width W2 of a land portion 14b on a tire widthwise outermost side of the half portion 1b on the other side of the tire 1, which is partitioned by the circumferential main groove 13 and the tread edge TE2. Further, in the present embodiment, a central land portion 15a is partitioned by the circumferential main grooves 11 and 12, and a central land portion 15b is partitioned by the circumferential main grooves 12 and 13.

As illustrated in FIG. 1, on the land portion 14a on the tire widthwise outermost side of the half portion 1a on one side, one circumferential minor groove 16 is formed. Moreover, on the land portions 14a and 14b on the tire widthwise outermost sides and the central land portions 15a and 15b, sipes 17a, 17b, 17c and 17d of a predetermined pattern are respectively formed. Further, on the land portions 14a and 14b on the tire widthwise outermost sides, lateral grooves 18a and 18b extending in the tire width direction are respectively formed.

Figure 3:
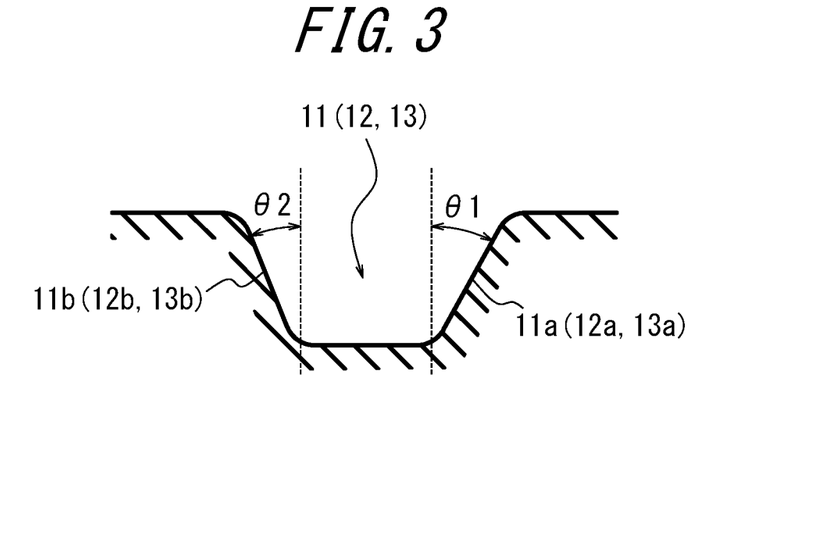
FIG. 3 illustrates a tire widthwise cross sectional view of the circumferential main groove of the tread pattern of FIG. 2.

FIG. 3 illustrates a tire widthwise cross sectional view of the circumferential main groove of the tread pattern of FIG. 2. As illustrated in FIG. 3, in the present embodiment, at an unloaded condition, when the tire 1 is mounted to the rim R and is applied with a prescribed internal pressure, the circumferential main groove 11 is formed in a manner such that an angle θ1 of the groove wall 11a formed on one tire widthwise side of the tire 1 to the tire radial direction is larger than an angle θ2 of the groove wall 11b formed on the other tire widthwise side of the tire 1 to the tire radial direction. Similarly, the circumferential main groove 12 is formed in a manner such that an angle θ1 of a groove wall 12a formed on one tire widthwise side of the tire 1 to the tire radial direction is larger than an angle θ2 of a groove wall 12b formed on the other tire widthwise side of the tire 1 to the tire radial direction; and the circumferential main groove 13 is formed in a manner such that an angle θ1 of a groove wall 13a formed on one tire widthwise side of the tire 1 to the tire radial direction is larger than an angle θ2 of a groove wall 13b formed on the other tire widthwise side of the tire 1 to the tire radial direction.

The effect of the tire according to present embodiment is described in the following. Here, described is the effect when the tire is mounted to a vehicle in a manner such that the aforementioned half portion on one tire widthwise side (the half portion on the side on which the side reinforcement layer 9 is arranged) is on an outer side when mounted to the vehicle. According to the tire of the present embodiment, the side reinforcement layer 9, which is formed of a treated member formed by coating with rubber organic fiber cords extending parallelly to the ply cords of the carcass ply of the carcass main body 5a of the carcass 5, is arranged (on the tire widthwise outer side of the carcass main body 5a in the present embodiment) only on the sidewall portion 3a of the half portion 1a on the outer side when mounted to the vehicle partitioned by the tire equatorial plain CL; the tire radial inner end 9a of the side reinforcement layer 9 is located on a side inner in the tire radial direction than a tire radial outermost position RO of a rim flange; and the tire radial outermost end 9b of the side reinforcement layer 9 overlaps the belt 6 (the maximum width belt layer 6a) in the tire width direction by 5 mm or more. Therefore, it is possible to improve the resistance to pinch cut of the outer side when mounted to the vehicle without increasing the number of carcass plies of the carcass 5, and thus it is possible to achieve both pinch cut resistance and weight reduction.

Moreover, according to the tire of the present embodiment, the tread portion 2 has thereon one or more circumferential main grooves 11, 12 and 13 extending in the tire circumferential direction, and the contact width W1 of the tire widthwise outermost land portion 14a of the half portion 1a on one tire widthwise side is set larger than the contact width W2 of the tire widthwise outermost land portion 14b of the half portion 1a on the other tire widthwise side. Therefore, the variation of conicity due to the asymmetric structure obtained by arranging the side reinforcement layer 9 is counterbalanced by the conicity generated by setting the contact width W1 larger than the contact width W2 and thereby increasing the rigidity of the outer side when mounted to the vehicle.

As mentioned above, according to the tire of the present embodiment, it is possible to achieve both weight reduction and durability, and simultaneously optimize the conicity.

At an unloaded condition, when the tire 1 is mounted to an applicable rim and is applied with a prescribed internal pressure, in the case where the tire radial inner end 9a of the side reinforcement layer 9 is not located on a side inner in the tire radial direction than the tire radial outermost position RO of the rim flange, and/or the tire widthwise overlap of the tire radial outer end 9b of the side reinforcement layer 9 and the belt 6 (the maximum width belt layer 6a) is less than 5 mm, there is the probability that reinforcement to the sidewall portion 3a on one side is insufficient.

Here, in this disclosure, the contact width W1 of the tire widthwise outermost land portion 14a on the half portion 1a on one tire widthwise side is preferably 1 to 3 mm larger than the contact width W2 of the tire widthwise outermost land portion 14b on the half portion 1b on the other tire widthwise side. Due to such configuration, the conicity can be optimized more appropriately.

In the pneumatic tire 1 of this disclosure, the thickness of the side rubber of the sidewall portion 3b on the half portion 1b on the other tire widthwise side is preferably larger than the thickness of the side rubber of the sidewall portion 3a on the half portion 1a on one tire widthwise side. According to such configuration, even if the side reinforcement layer 9 is disposed only on the sidewall portion 3a on the half portion 1a on one side, it is possible to prevent the tire widthwise thickness of the sidewall portion 3a on the half portion 1a on one side from being excessively larger than the tire widthwise thickness of the sidewall portion 3b on the half portion 1b on the other side.

In the pneumatic tire of this disclosure, regarding the tire widthwise distance from an end of the belt (in the present embodiment, the maximum width belt layer 6a) to the tire equatorial plain CL, the half portion 1b on the other tire widthwise side is preferably larger than the half portion 1a on one tire widthwise side. According to such configuration, it is possible to improve the rigidity of the inner side when mounted to the vehicle, maintain the durability of the outer side when mounted to the vehicle at a high level, and improve the durability of the inner side when mounted to the vehicle.

In the pneumatic tire of this disclosure, at an unloaded condition, when the tire is mounted to an applicable rim and is applied with a prescribed internal pressure, regarding the angle of the groove walls of the circumferential main grooves 11, 12 and 13 to the tire radial direction, one tire widthwise side (θ1) is preferably larger than the other tire widthwise side (θ2). In this way, it is possible to ensure the rigidity of the land portions on one tire widthwise side (the outer side when mounted to the vehicle) sandwiching the circumferential grooves, and further optimize the conicity.

Hereinafter, examples for this disclosure are described, while this disclosure is not limited to these examples.

EXAMPLES

In order to certify the effect of this disclosure, the tires of Examples 1 to 5 and Comparative Examples 1 to 3 were produced experimentally. The dimensions of each tire are as shown in the following Table 1. The tire size of each is 215/645R17. Further, with respect to each tire, tests for evaluating pinch cut resistance and uniformity were performed. Here, as illustrated in FIG. 1, each tire is a pneumatic tire, comprising: a carcass formed of at least one carcass ply, the carcass ply formed of a main body and a folded-up portion, the main body extending toroidally from a tread portion through a pair of sidewall portions to a pair of bead portions, and fixed to bead cores embedded in the bead portions, the folded-up portion extending from the main body and formed by folding up a circumference of the bead cores from a tire widthwise inner side to a tire widthwise outer side; a belt formed of one or more belt layers arranged on a tire radial outer side of a crown portion of the carcass; and bead fillers provided on a tire radial outer side of the bead cores, in which the bead fillers are provided such that at least a part thereof is sandwiched between the carcass main body and the folded-up portion.

<Tire Structure>

In the tires of Examples 1 to 5 and Comparative Examples 1 to 2, the carcass on the half portion 1a on one side of the tire 1 was formed of one carcass ply, and the side reinforcement layer 9 was inserted therein. The carcass on the half portion 1b on the other side of the tire 1 was formed of one carcass ply, and an asymmetrical structure was used as a low-turn-up structure. In the tire of Comparative Example 3, the half portion on one side and the half portion on the other side was set to a symmetrical structure as an envelope structure of one carcass ply.

<Pinch Cut Resistance>

Figure 4:
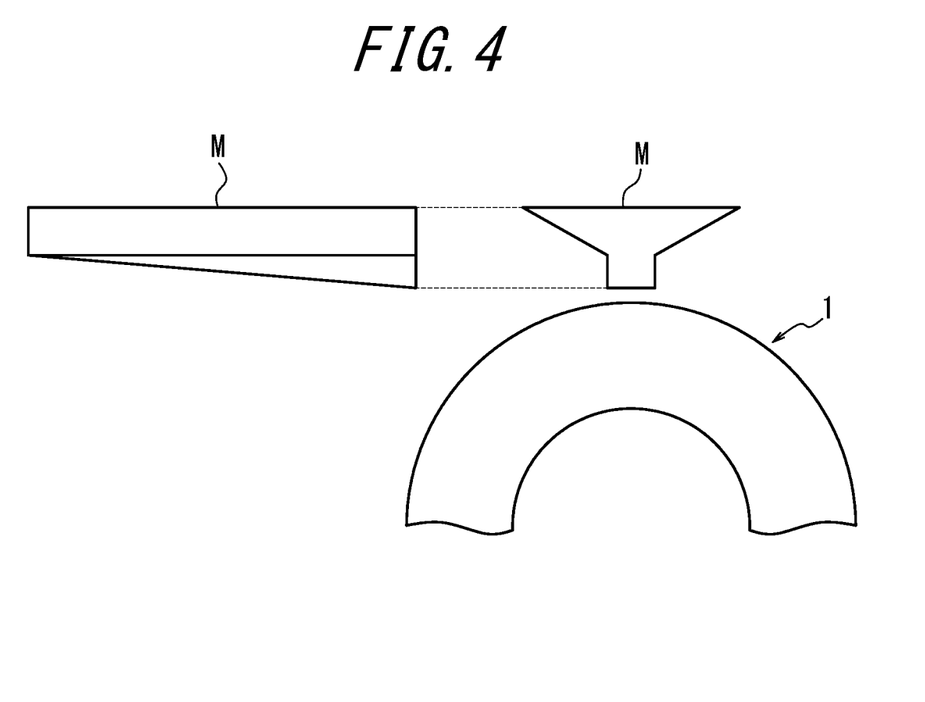
FIG. 4 illustrates the cutting test.

At a stationary state after the tires of the aforementioned examples and comparative examples were mounted to a rim (size: 7J), applied with an internal pressure of 230 kPa, an mounted to a vehicle in a manner such that the half portion 1a on one side is on the outer side of the vehicle, a tapered metal piece M as illustrated in FIG. 4 was slowly pushed into the tread surface of the tire, and the value obtained by integrating the displacement amount of the metal piece M and the load applied to the metal piece when damage or failure occurs to the ply was calculated as the pinch cut resistance. The test was performed by pushing the metal piece onto the tread edge on the vehicle inner side from the vehicle outer side of the tire.

<Uniformity>

After the tires of the aforementioned examples and comparative examples were mounted to a rim (size: 7J), and applied with an internal pressure of 196 kPa, at a state where the tire is rotated at 60 r/min and applied with a load of 85% of a maximum load, the conicity was measured by using the degree of variation of tire radius force (RFV), the degree of variation of lateral force (LFV), and the average value of lateral force (LFD).

In the case where an average value of a waveform of a side force to the inner side direction when mounted to the vehicle per rotation of the tire (the side force applied to the drum) is LFD, the conicity is defined as follows.

conicity=(LFD in one rotation direction of the tire+ LFD during reverse rotation)/2

The result was as shown in Table 1. In the table, the result of pinch cut resistance is represented with index evaluation, with the pinch cut resistance on the outer side of the comparative example tire 3 as 100. Here, a larger index shows a better pinch cut resistance. The result of uniformity in the table shows the variation of tire conicity with respect to the test result of the uniformity of the comparative example tire 3.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Side reinforcement layer 9 | Overlapping width D (mm) | 10 | 10 | 10 | 10 | 10 | 10 | 3 | — |
| Land portion 14a | Contact width W1 (mm) | 30 | 30 | 30 | 28.5 | 32 | 28 | 28 | 28 |
| Land portion 14b | Contact width W2 (mm) | 28 | 28 | 28 | 28 | 28 | 28 | 28 | 28 |
| W1 − W2 (mm) |  | 2 | 2 | 2 | 0.5 | 4 | 0 | 0 | 0 |
| Inclined belt layer 3a | d1 (mm) | 87 | 87 | 88 | 88 | 88 | 87 | 87 | 87 |
|  | d2 (mm) | 88 | 88 | 87 | 87 | 87 | 87 | 87 | 87 |
| Groove inclination angle of grooves | θ1 | 12 | 8 | 8 | 8 | 8 | 8 | 8 | 8 |
|  | θ2 | 8 | 12 | 12 | 12 | 12 | 8 | 8 | 8 |
| Pinch out resistance on vehicle outer side |  | 110 | 110 | 112 | 110 | 110 | 110 | 105 | 100 |
| Pinch out resistance on vehicle inner side |  | 102 | 102 | 101 | 100 | 100 | 100 | 100 | 100 |
| Uniformity |  | 0 | −16 | −16 | −25 | 16 | −40 | −15 | 0 |

As shown in Table 1, it is understood that as compared to the tires according to comparative examples 1 to 3, in each tire according to examples 1 to 5, even when the durability was high, the variation ratio of uniformity (conicity variation) was low, and the conicity could be optimized. Comparing Example 1 with Example 2, Example 1, in which θ1>θ2, had further reduced conicity variation. Comparing Example 2 with Example 3, in Example 2, in which d2>d1, it was possible to maintain a high level of durability of the outer side when mounted to the vehicle, and simultaneously improve the durability of the inner side when mounted to the vehicle. Comparing Example 3 with Example 4, it is understood that in Example 3, in which 3≤(W1−W2)≤3, the uniformity variation was smaller. Comparing Example 3 with Example 5, it is understood that in Example 3, in which 3≤(W1−W2)≤3, the durability of the inner side when mounted to the vehicle could be improved.

REFERENCE SIGNS LIST

1: tire (pneumatic tire)
1a: half portion
1b: half portion
2: tread portion
3: sidewall portion
4: bead portion
4a: bead core
5: carcass
5a: carcass main body
5b: carcass folded-up portion
6: belt
6a, 6b: belt layer
7: bead filler
8: belt reinforcement layer
9: side reinforcement layer
9a: tire radial inner end
9b: tire radial outer end
11: circumferential main groove
12: circumferential main groove
13: circumferential main groove
14a: outermost land portion
14b: outermost land portion
15a: central land portion
15b: central land portion
16: minor groove
17a: sipe
17b: sipe
17c: sipe
17d: sipe
18a: lateral groove
18b: lateral groove
CL: tire equatorial plain
d1: distance
d2: distance
D: width
M: metal piece
R: rim
RO: tire radial outermost position
TE1: tread edge
TE2: tread edge
W1: contact width
W2: contact width

The invention claimed is:

1. A pneumatic tire, comprising: a carcass formed of at least one carcass ply, the carcass ply formed of a carcass main body and a carcass folded-up portion, the carcass main body extending toroidally from a tread portion through a pair of sidewall portions to a pair of bead portions, and fixed to bead cores embedded in the bead portions, the carcass folded-up portion extending from the carcass main body and formed by folding up a circumference of the bead cores from a tire widthwise inner side to a tire widthwise outer side, the carcass ply being formed from a plurality of carcass ply cords, and the carcass ply cords that are positioned on one tire widthwise side partitioned by a tire equatorial plane extend in directions that are symmetrical with those of the carcass ply cords positioned on the other tire widthwise side of the tire equatorial plane; a belt formed of one or more belt layers arranged on a tire radial outer side of a crown portion of the carcass; and bead fillers provided on a tire radial outer side of the bead cores, wherein:

the bead fillers are provided such that at least a part thereof is sandwiched between the carcass main body and the carcass folded-up portion, a side reinforcement layer is arranged inside the carcass main body only on a sidewall portion of a half portion on the one tire widthwise side partitioned by the tire equatorial plane, the side reinforcement layer formed of a treated member, the treated member formed by coating with rubber organic fiber cords extending parallelly to the carcass ply cords of the carcass ply of the carcass main body, at an unloaded condition, when the pneumatic tire is mounted to an applicable rim and is applied with a prescribed internal pressure, a tire radial inner end of the side reinforcement layer is located on a side inner in the tire radial direction than a tire radial outermost position of a rim flange, and a tire radial outer end of the side reinforcement layer overlaps the belt by 5 mm or more in a tire widthwise direction, and the tread portion has one or more circumferential main grooves extending in a tire circumferential direction, including a first circumferential main groove, which is the circumferential main groove nearest the tire equatorial plane, a second circumferential main groove on the one tire widthwise side of the first circumferential main groove, and a third circumferential main groove on the other tire widthwise side of the first circumferential main groove, the first circumferential main groove being positioned off-center in the tire widthwise direction with respect to the tire equatorial plane, and at an unloaded condition, when the pneumatic tire is mounted to an applicable rim and is applied with a prescribed internal pressure, a contact width of a first tire widthwise outermost land portion partitioned by the second circumferential main grooves and a tread edge on the one tire widthwise side is larger than a contact width of a second tire widthwise outermost land portion partitioned by the third circumferential main grooves and a tread edge on the other tire widthwise side.

2. The pneumatic tire according to claim 1, wherein: a contact width of the first tire widthwise outermost land portion is 1 to 3 mm larger than a contact width of the second tire widthwise outermost land portion the half portion on the other tire widthwise side.

3. The pneumatic tire according to claim 2, wherein: a thickness of a side rubber of the sidewall portion on the half portion on the other tire widthwise side is larger than a thickness of a side rubber of the sidewall portion on the half portion on the one tire widthwise side.

4. The pneumatic tire according to claim 3, wherein: at an unloaded condition, when the pneumatic tire is mounted to an applicable rim and is applied with a prescribed internal pressure, a tire widthwise distance from an end of the belt to the tire equatorial plane of the half portion on the other tire widthwise side is larger than the half portion on the one tire widthwise side.

5. The pneumatic tire according to claim 2, wherein: at an unloaded condition, when the pneumatic tire is mounted to an applicable rim and is applied with a prescribed internal pressure, a tire widthwise distance from an end of the belt to the tire equatorial plane of the half portion on the other tire widthwise side is larger than the half portion on the one tire widthwise side.

6. The pneumatic tire according to claim 1, wherein: a thickness of a side rubber of the sidewall portion on the half portion on the other tire widthwise side is larger than a thickness of a side rubber of the sidewall portion on the half portion on the one tire widthwise side.

7. The pneumatic tire according to claim 6, wherein: at an unloaded condition, when the pneumatic tire is mounted to an applicable rim and is applied with a prescribed internal pressure, a tire widthwise distance from an end of the belt to the tire equatorial plane of the half portion on the other tire widthwise side is larger than the half portion on the one tire widthwise side.

8. The pneumatic tire according to claim 1, wherein: at an unloaded condition, when the pneumatic tire is mounted to an applicable rim and is applied with a prescribed internal pressure, a tire widthwise distance from an end of the belt to the tire equatorial plane of the half portion on the other tire widthwise side is larger than the half portion on the one tire widthwise side.

9. The pneumatic tire according to claim 1, wherein an angle of groove walls of the circumferential main grooves to the tire radial direction of one tire widthwise side is larger than the other tire widthwise side.

10. The pneumatic tire according to claim 1, wherein the first circumferential main groove is positioned between the tire equatorial plane and the third circumferential main groove.

11. The pneumatic tire according to claim 1, wherein the one side of the tire width outermost land portion has only one circumferential minor groove, which is narrower than each circumferential main groove.

12. The pneumatic tire according to claim 1, wherein the second tire widthwise outermost land portion has no circumferential minor groove which is narrower than each circumferential main groove.

13. The pneumatic tire according to claim 1, wherein when the pneumatic tire is mounted to an applicable rim and is applied with a prescribed internal pressure, in each of the first, second, and third circumferential main grooves an angle of a groove wall on one tire wire widthwise side of the groove is larger than angle of a groove wall on the other tire widthwise side of the groove.

* * * * *